United States Patent [19]

Hagen et al.

[11] Patent Number: 4,589,813
[45] Date of Patent: May 20, 1986

[54] TRUCK RESTRAINING DEVICE

[76] Inventors: James P. Hagen, W322 N6811 Wildwood Pt. Rd., Hartland, Wis. 53029; Walter E. Meyer, 3359 Highway "I", Saukville, Wis. 53090

[21] Appl. No.: 618,069
[22] Filed: Jun. 7, 1984
[51] Int. Cl.[4] .............................................. B65G 67/02
[52] U.S. Cl. ..................... 414/401; 414/396
[58] Field of Search ............ 414/401, 396, 584; 14/71.1; 410/3, 7, 18, 56, 135

[56] References Cited

U.S. PATENT DOCUMENTS 4,264,259  4/1981  Hipp ..................................... 414/401
4,400,127  8/1983  Metz .................................... 414/401
4,488,325  12/1984  Bennett et al. ................. 414/401 X Primary Examiner—Robert J. Spar
Assistant Examiner—Stuart J. Millman
Attorney, Agent, or Firm—Ronald E. Barry

[57] ABSTRACT

A restraining device or "keeper" for locking a truck having an ICC bar to a dock, the device including an arm pivotally secured to the front of the dock for movement between a storage position against the front of the dock and an operative position extending outward from the dock, a restraining bar mounted for vertical movement relative to the swing arm to a position to block the path of motion of the ICC bar away from the dock, and a latch assembly for locking the swing arm in the operative and inoperative positions.

9 Claims, 8 Drawing Figures

TRUCK RESTRAINING DEVICE

BACKGROUND OF THE INVENTION

Unloading semitrailers or trucks at docks require that the truck be backed into engagement with the bumpers provided on the dock. The truck is generally blocked so that it cannot be moved during unloading. Various devices have been used to hold the truck in a fixed position during loading or unloading to prevent injury if the truck should accidentally move away from the dock. Most of these devices require mechanical attachment to the ICC bar on the back of the truck.

SUMMARY OF THE INVENTION

The safety restraining device or "keeper" according to the present invention provides a simple and easy method of limiting the amount of movement of a truck or semitrailer once it has been positioned next to the dock for loading or unloading. The keeper is moved into a position to block the path of motion of the "ICC bar" which is provided on the back of a truck or semitrailer. ICC bars are required by government safety regulations to prevent small vehicles from passing under the truck bed. The keeper is designed to be stored against the wall to provide clearance for general cleaning as well as making the dock usable for small vehicles. The keeper can be swung out away from the wall under the truck or semitrailer. A restraining bar is provided on the end of the keeper and is powered to a position to block the path of motion of the ICC bar, if the truck moves away from the dock.

IN THE DRAWINGS

DESCRIPTION OF THE INVENTION

Figure 1:
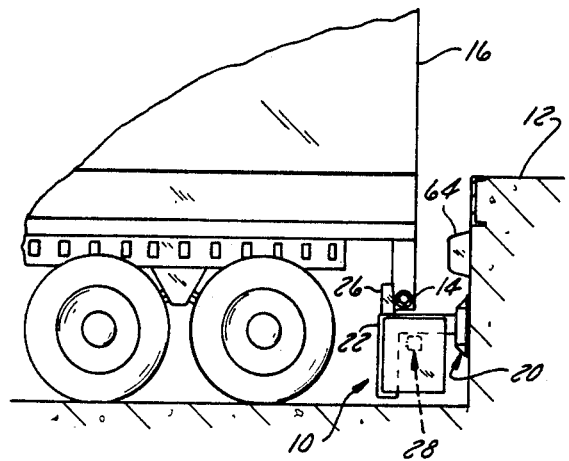
FIG. 1 is a view of a portion of the rear of a semitrailer showing the keeper in a position to engage the ICC bar.
Figure 2:
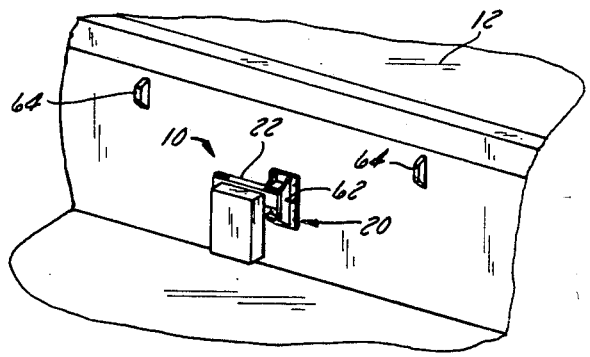
FIG. 2 is a view of a portion of the loading dock showing the storage position of the keeper.

The keeper 10, as seen in FIG. 1, is mounted on the front wall of a dock 12 and extends outward therefrom to a position to block the path of motion of the ICC bar 14 on the rear of a semitrailer 16. It is generally understood that the minimum height of the ICC bar is twenty two inches from the floor and that in most instances this height will change as the truck is loaded or unloaded. It will also be noted that the truck does not necessarily have to be positioned in abutting engagement with the front of the dock 12, but can be located a short distance from the dock without interfering with the loading and unloading operation.

As seen in FIG. 1, the keeper is located in a predetermined position relative to the ground and is provided with means in the form of a restraining bar 26 which can be raised into the path of motion of the ICC bar 14. The bar 26 can be raised to a height sufficient to accommodate the range of height variations of the ICC bar normally encountered in a loading operation. One of the advantages of the present invention is the ability to store the keeper against the front face or wall of the dock 12 so that it does not obstruct the movement of a dock leveler below dock level or interfere with the general cleaning requirements of a driveway.

Figure 3:
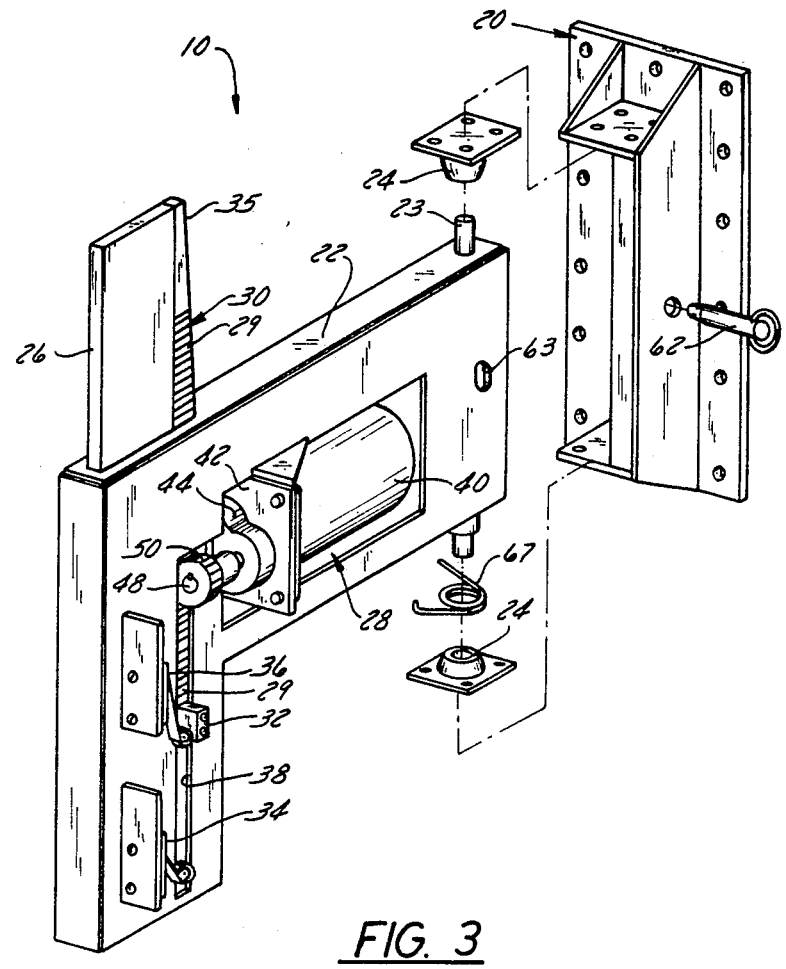
FIG. 3 is an exploded perspective view of the keeper with the motor cover removed.
Figure 4:
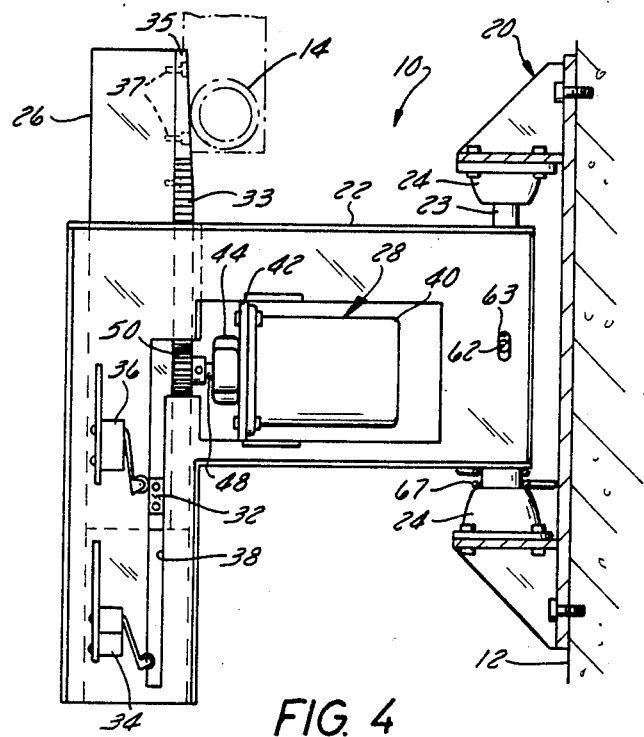
FIG. 4 is a side elevation view of the keeper showing the restraining bar in the elevated position.
Figure 5:
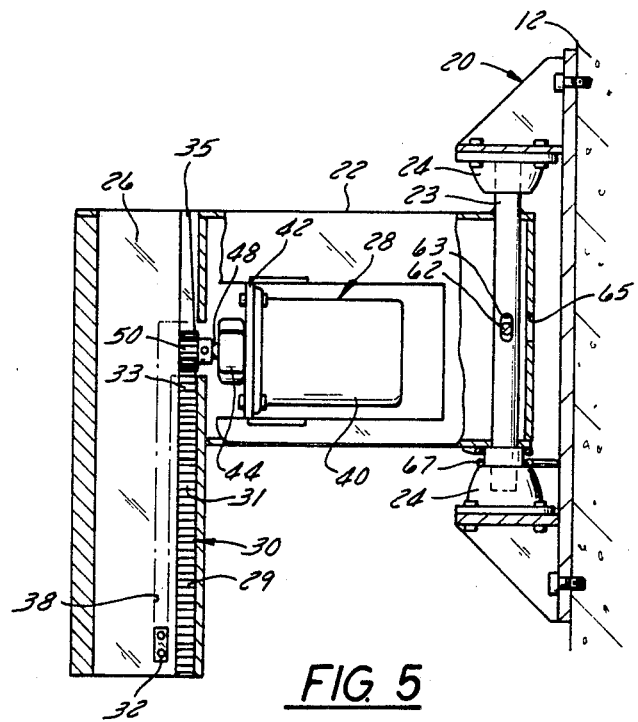
FIG. 5 is section view similar to FIG. 4 showing the restraining bar retracted.

Referring to FIGS. 3, 4, and 5, the keeper 10 includes a mounting bracket 20 and an arm 22 having a shaft 23 pivotally mounted in a pair of bearings 24 located on the mounting bracket 20. The restraining bar 26 is mounted in the end of the arm 22 for movement from an inoperative position within the arm 22 as seen in FIG. 5 to an operative position as seen in FIGS. 3 and 4. The restraining bar 26 is moved by means of a drive motor assembly 28 mounted on the arm 22 in a position to operatively engage the restraining bar 26.

Figure 8:
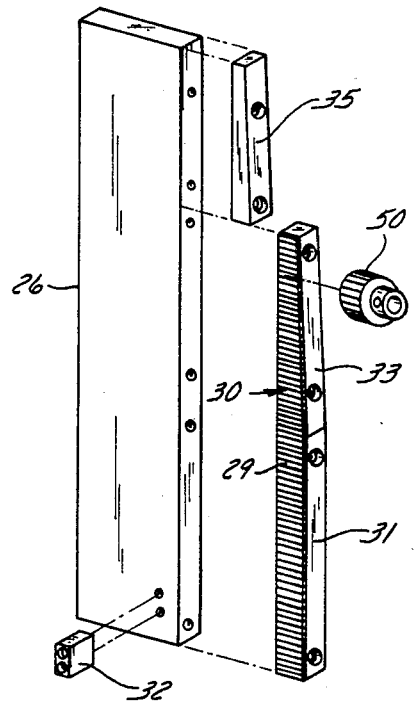
FIG. 8 is a perspective view of the retaining bar.

In this regard, it should be noted that a gear rack assembly 30 is provided on the edge of the restraining bar 26. The gear rack assembly 30 as seen in FIG. 8 is made up of three sections 31, 33 and 35 which are secured to the edge of the bar 26 by bolts 37. A gear rack 29 is provided on the sides of sections 31 and 33.

Means are provided on the gear rack assembly 30 to clear the bar 26 from the ICC bar 14 when the bar 26 is moved to the inoperative position. As seen in FIG. 8, the bottom section 31 is in the form of a straight bar, the middle section 33 and top section 35 are tapered toward the top of the bar 26. Referring to FIG. 4, the ICC bar 14 is shown in abutting engagement with the top section 35 of the gear rack 30. When the bar 26 is moved downward into the end of arm 22, the taper of gear rack sections 33 and 35 will release the bar 26 from the ICC bar 14 as soon as the bar starts its downward motion. With this arrangement, the restraining bar 26 will not rub on the ICC bar making it easier to withdraw the bar into the arm 22.

The limits of motion of the bar 26 are controlled by means of a pin 32 mounted on the bottom of the bar 26 in a position to engage microswitches 34 and 36. The pin 32 extends outward through an opening 38 provided in the sidewall of the swing arm 22. As seen in FIG. 4, when the motor assembly 28 is started, the pin 32 moves away from switch 34 allowing switch 34 to close and open switch 36 when the bar 26 reaches the upper position. On return motion the switch operation is reversed.

The drive motor assembly 28 includes a reversible drive motor 40 mounted on a bracket 42 on the swing arm 22. The drive motor 40 includes a speed reduction gear drive unit 44 which includes a drive gear 50 mounted on the end of a shaft 48 in a position to engage rack 29. The motor 40 drives the shaft 48 to move the bar 26 up or down.

Figure 6:
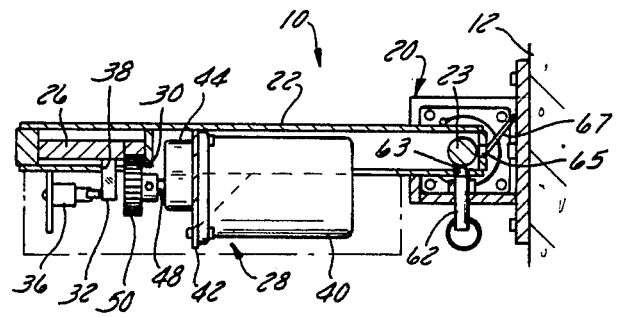
FIG. 6 is a top view in section of the keeper.
Figure 7:
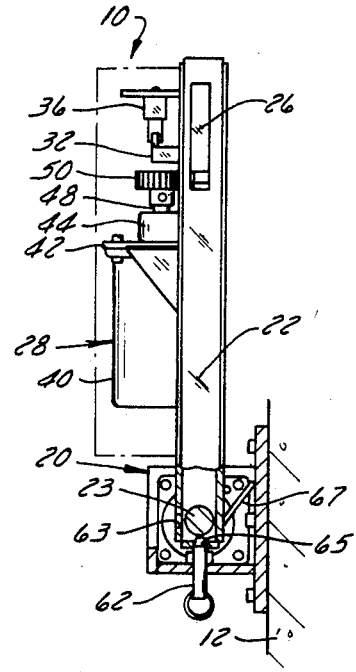
FIG. 7 is a top view of the keeper shown in the storage position.

The keeper 10 is movable between an operative position extending outward from the wall, FIG. 6, and an inoperative position against the wall, FIG. 7. Means are provided for locking the keeper in either of these positions. Such means is in the form of a pin 62 mounted on the bracket 20 and a pair of openings 63, 65 provided on the arm 22. In the operative position of the arm 22, the pin 62 is pushed into opening 63. In the inoperative position of the arm 22, the pin 62 is moved into the opening 65. The pin 62 can be moved either manually or powered by a solenoid. In this regard, if a solenoid is used, the pin 62 should be biased into the openings by means of a spring.

The keeper 10 can be manually moved between the operative and inoperative positions, powered by a second motor operatively connected to shaft 23 or biased to the operative position by a coil spring 67. If the keeper is powered, a fully automatic electrical system is used as described below.

In operation, the keeper is normally stored in the inoperative position on the face of the dock 12. The keeper is released for movement to the operative position by pulling pin 62 outward from arm 22. The arm 22 is pivoted outward to the operative position and locked in placed by moving pin 62 into opening 63. A truck is then backed into engagement with bumpers 64 with the ICC bar 14 located above the arm 22. The motor 48 is activated to move the restraining bar 26 upward to a position inward of the ICC bar. In the event the truck moves, it is restricted upon engagement of the ICC bar with the restraining bar 26. It should be noted that the outer end of the swing arm is located in close proximity to the ground. If the truck moves far enough to shift the restraining bar, the swing arm will engage the ground preventing distortion of the swing arm.

After the truck is loaded, the restraining bar 26 is retracted by activating the motor 40. The keeper can be left in the operative position or moved to the storage position by releasing pin 62 from the arm 22. Another advantage of this feature of the invention is to clear the dock level area so that it can be used by a smaller truck.

The keeper of the present invention is also easily adaptable to a fully automatic operation. In this regard, the pin 62 can be actuated by a solenoid and the arm powered between open and closed positions by a second reversible motor operatively connected to drive shaft 23. The sequence of operations in the automatic mode are as follows:

The truck on engaging the bumper 64, would close a switch energizing the solenoid connected to pin 62. Once the pin 62 is released from arm 22, a second switch is closed to energize the second motor to move the arm to the operative position. Once the arm 22 reaches the operative position, the second motor is turned off and the solenoid de-energized to release the pin 62 to lock the arm in position. Once the arm 22 is locked in position, the motor 40 is actuated to raise the restraining arm 26. When the restraining arm 26 is stopped by opening switch 36, a signal switch can be closed to indicate that the restraining bar is in position.

The embodiments of the invention in which an exclusive property or privilege is claimed, are defined as follows:

1. An apparatus for restricting the movement of a parked vehicle having an "ICC" bar on the rear end thereof from moving away from a loading dock, said apparatus comprising first means mounted on the front of the loading dock for movement between a first position adjacent to the front of the dock and a second position extending outwardly therefrom a distance sufficient to pass under the "ICC" bar, second means mounted on the first means for vertical movement with respect to the first means to a blocking position to restrict movement of the "ICC" bar to a predetermined distance from the loading dock, and drive means for selectively moving said second means to said blocking position.

2. The apparatus according to claim 1 including means for moving said first means between the first and second positions.

3. The apparatus according to claim 2 including pin means for releasably locking said first means in said first and second positions.

4. An apparatus for restricting movement of a vehicle parked at a loading dock, said vehicle having an "ICC" bar on the rear end thereof, and said apparatus comprising a swing arm mounted on the front of the loading dock for movement between a first position adjacent to the front of the loading dock and a second position extending outwardly therefrom a distance sufficient to pass under the "ICC" bar, a restraining bar mounted on the outer end of said swing arm, motor means for moving said restraining bar with respect to said swing arm between an operative position restricting the movement of the "ICC" bar to a predetermined distance from the loading dock and an inoperative position below the "ICC" bar, and means for locking said swing arm in the second position.

5. The apparatus according to claim 4 including a support bracket mounted on the front of the loading dock to pivotally support the swing arm for movement between said first position adjacent to the front of the loading dock and said second position extending outwardly from the loading dock.

6. The apparatus according to claim 5 said locking means including a pin for locking the swing arm in the first position.

7. The apparatus according to claim 6 wherein said restraining bar includes a gear rack, and said motor means includes a reversible motor and a gear operatively positioned to engage said gear rack to drive said restraining bar between the operative and inoperative position.

8. The apparatus according to claim 7 wherein said arm includes a depending section located in close proximity to the ground whereby forces acting on the upper end of said restraining bar will be resisted by the engagement of the depending section with the ground.

9. The apparatus according to claim 4, 5, 6 or 7 wherein said restraining bar has one end tapered away from said dock to release the restraining bar from ICC bar on retraction into the swing arm.

* * * * *